(12) United States Patent
Sullivan et al.

(10) Patent No.: US 12,527,472 B2
(45) Date of Patent: Jan. 20, 2026

(54) SYSTEMS AND METHODS FOR DYNAMIC TEMPERATURE COMPENSATION OF TEAR OSMOLARITY

(71) Applicant: TearLab Research, Inc., Escondido, CA (US)

(72) Inventors: Benjamin Sullivan, Concord, MA (US); Steve Zmina, Las Vegas, NV (US)

(73) Assignee: TEARLAB RESEARCH, INC, Escondido, CA (US)

( * ) Notice: Subject to any disclaimer, the term of this patent is extended or adjusted under 35 U.S.C. 154(b) by 351 days.

(21) Appl. No.: 18/230,917

(22) Filed: Aug. 7, 2023

(65) Prior Publication Data

US 2024/0065543 A1    Feb. 29, 2024

Related U.S. Application Data

(60) Provisional application No. 63/402,598, filed on Aug. 31, 2022.

(51) Int. Cl.
*A61B 3/10* (2006.01)
*A61B 10/00* (2006.01)
*B01L 3/00* (2006.01)

(52) U.S. Cl.
CPC .......... *A61B 3/101* (2013.01); *A61B 10/0045* (2013.01); *B01L 3/502753* (2013.01); *A61B 2010/0067* (2013.01)

(58) Field of Classification Search
CPC ................ A61B 3/101; A61B 10/0045; A61B 2010/0067; B01L 3/502753; B01L 3/5027; G01N 21/35; G01N 33/487; G01N 15/0806; G01N 15/0826
See application file for complete search history.

(56) References Cited

U.S. PATENT DOCUMENTS 7,017,394 B2 * 3/2006 Sullivan ................ G01N 13/04
324/692
7,051,569 B2   5/2006 Sullivan et al.
(Continued)

FOREIGN PATENT DOCUMENTS

ES         2669069 T3 *  5/2018  ............. A61B 3/101
WO    WO-2004017050 A1   2/2004
(Continued)

OTHER PUBLICATIONS

Emissivity—Metals. Emissivity Values for Metals. Fluke Processing Instruments. Available at https://www.flukeprocessinstruments.com/en-us/print/node/35230 (No date available).
(Continued)

*Primary Examiner* — Francis C Gray
(74) *Attorney, Agent, or Firm* — Simpson & Simpson, PLLC; Jeffrey B. Powers (57) ABSTRACT

Systems, methods, and devices for measurement of the osmotic pressure of fluids and, more particularly, to improving the measurement accuracy and precision of the osmolarity of the tear film. The approaches described herein improves upon the existing art of tear film osmometry to provide better performance in the presence of environmental instability.

20 Claims, 6 Drawing Sheets

(56) References Cited

U.S. PATENT DOCUMENTS

| | | | |
|---|---|---|---|
| 7,111,502 B2 * | 9/2006 | Sullivan | G01N 13/04 73/64.47 |
| 7,129,717 B2 * | 10/2006 | Donsky | A61B 3/101 324/692 |
| 7,204,122 B2 | 4/2007 | Sullivan et al. | |
| 7,574,902 B2 | 8/2009 | Sullivan | |
| 7,810,380 B2 | 10/2010 | Donsky et al. | |
| 7,905,134 B2 | 3/2011 | Sullivan | |
| 7,987,702 B2 | 8/2011 | Sullivan | |
| 8,020,433 B2 | 9/2011 | Sullivan et al. | |
| 8,627,712 B2 | 1/2014 | Donsky et al. | |
| 8,628,731 B2 | 1/2014 | Donsky et al. | |
| 8,713,997 B2 | 5/2014 | Donsky et al. | |
| 9,217,701 B2 | 12/2015 | Sullivan | |
| 9,217,702 B2 | 12/2015 | Sullivan | |
| 9,335,243 B2 | 5/2016 | Donsky et al. | |
| 11,536,707 B2 | 12/2022 | Sullivan et al. | |
| 2004/0039298 A1 * | 2/2004 | Abreu | A61B 5/1455 600/558 |
| 2005/0176029 A1 | 8/2005 | Heller et al. | |
| 2012/0067112 A1 | 3/2012 | Sullivan et al. | |
| 2013/0175185 A1 | 7/2013 | Donsky et al. | |
| 2013/0220833 A1 | 8/2013 | Sullivan | |
| 2013/0233061 A1 | 9/2013 | Sullivan | |
| 2015/0045694 A1 | 2/2015 | Sullivan et al. | |
| 2016/0282252 A1 | 9/2016 | Sullivan | |
| 2017/0108423 A1 | 4/2017 | Donsky et al. | |

FOREIGN PATENT DOCUMENTS

| | | | | |
|---|---|---|---|---|
| WO | WO-2005040755 A2 | | 5/2005 | |
| WO | WO-2005051309 A2 | | 6/2005 | |
| WO | WO-2005076796 A2 | | 8/2005 | |
| WO | WO-2005089207 A2 | | 9/2005 | |
| WO | WO-2005089210 A2 | | 9/2005 | |
| WO | WO-2005094286 A2 | | 10/2005 | |
| WO | WO-2008073399 A1 | | 6/2008 | |
| WO | WO-2008128248 A1 | | 10/2008 | |
| WO | WO-2011028519 A2 * | | 3/2011 | G01N 21/43 |
| WO | WO-2016049221 A1 | | 3/2016 | |

OTHER PUBLICATIONS

Rocha et al. Randomized, masked, in vitro comparison of three commercially available tear film osmometers. Clin Ophthalmol. 11:243-248 (2017).

TearLab Osmolarity Test Cards Instructions for Use, 930088 Rev M (2019).

* cited by examiner

SYSTEMS AND METHODS FOR DYNAMIC TEMPERATURE COMPENSATION OF TEAR OSMOLARITY

CROSS-REFERENCE

This application claims the benefit of U.S. Provisional Application No. 63/402,598, filed on Aug. 31, 2022, which is incorporated herein by reference in its entirety.

FIELD

The present disclosure relates generally to improving the measurement accuracy and precision of the osmotic pressure of fluids and, more particularly, to improving the measurement accuracy and precision of the osmolarity of the tear film.

BACKGROUND

The most common osmolarity measurement of a sample fluid, such as in the tear film, is achieved by depositing an aliquot volume of the sample fluid on a microchip having a substrate and a sample region of the substrate, wherein the volume of the sample fluid operatively covers a sufficient portion of the sample region such that energy imparted to the sample fluid is detected from the sample region to produce an output signal that indicates osmolarity of the sample fluid. Thus, an osmolarity measurement of the sample fluid can be obtained from the detected energy of the sample volume. The aliquot-sized sample volume can be quickly and easily obtained, even from dry eye patients. An aliquot volume can comprise, for example, a volume of no more than 20 microliters (µL) but can be as little as 1 nL. An osmolarity sensor system can receive the microchip and sample volume and can detect energy from the sample volume to display an accurate osmolarity measurement. In this way, a reliable osmolarity measurement can be obtained with minimum inconvenience and discomfort to a patient, without requiring a great deal of skill to obtain the measurement, and with a high degree of repeatability and accuracy.

Existing tear film osmolarity systems, such as the commercialized TearLab Osmolarity System use the ambient temperature of the room measured atop a base unit to compensate for the impact of temperature fluctuations on the impedance of the tear fluid. The system uses a handheld device (e.g., Pen) on which a disposable microfluidic test card attaches. The test card is comprised of a capsule and microfluidic chip. The capsule allows the user to handle and attach the disposable to the Pen without touching the mounted microfluidic chip to preserve hygienic conditions and temperature stability. Once a tear is collected, the Pen is docked into the base unit and the base unit estimates the ambient room temperature for use in the compensation algorithm. The temperature compensation algorithm of the TearLab Osmolarity System can use a linear correction of 2.14% per degree, where, given the measured impedance Z, the measured temperature T, the corrected impedance $Z_t = Z^* (1+(0.0214^*(T-25)))$. $Z_t$ is then converted to osmolarity using a calibration curve. In the TearLab Osmolarity System FDA 510(k), the single instrument precision measured over 20 consecutive days reported a total coefficient of variation of 1.87%-2.47%, corresponding to a standard deviation of ±5.2-8.0 mOsm/L. The system achieves high precision and accuracy when the environment is in equilibrium. For example, when compared to a reference solutions of 296 mOsm/L, 342 mOsm/L and 383 mOsm/L, the TearLab reported a correlation of $r^2=0.98$ across the dynamic range, with averages of 305.6±4.0, 352.2±5.5, and 389.8±4.0 mOsm/L, and coefficient of variations (CVs) of 1.3%, 1.6%, and 1.0%, respectively, whereas an impedance based osmometer that does not use temperature compensation, the i-Med Pharma i-Pen reported an $r^2=0.03$, with averages of 336.4±21.5, 342.0±20.7, and 345.7±22.0 mOsm/L, and CVs of 6.4%, 6.1%, and 6.4%, respectively [Rocha G, Gulliver E, Borovik A, Chan CC. Randomized, masked, in vitro comparison of three commercially available tear film osmometers. Clin Ophthalmol. 2017 Jan. 27; 11:243-248. doi: 10.2147/OPTH.S127035. PMID: 28184150; PMCID: PMC5291332]. Accordingly, when the temperature is near room temperature and very slowly changing, the TearLab Osmolarity System performs according to its labeling, which states: "Store Osmolarity Test Cards at controlled room temperature (20°-25° C./68°-77° F.); excursions are permitted to (15°-30° C./59°-86° F.). IMPORTANT: Test Cards not stored at room temperature should be at ambient temperature before use. Cold Test Cards may require several minutes to reach ambient temperature. Osmolarity Test Cards are stable until the expiration date marked on the label." [TearLab Osmolarity Test Cards Instructions for Use, 930088 Rev M, 2019]

Figure 1:
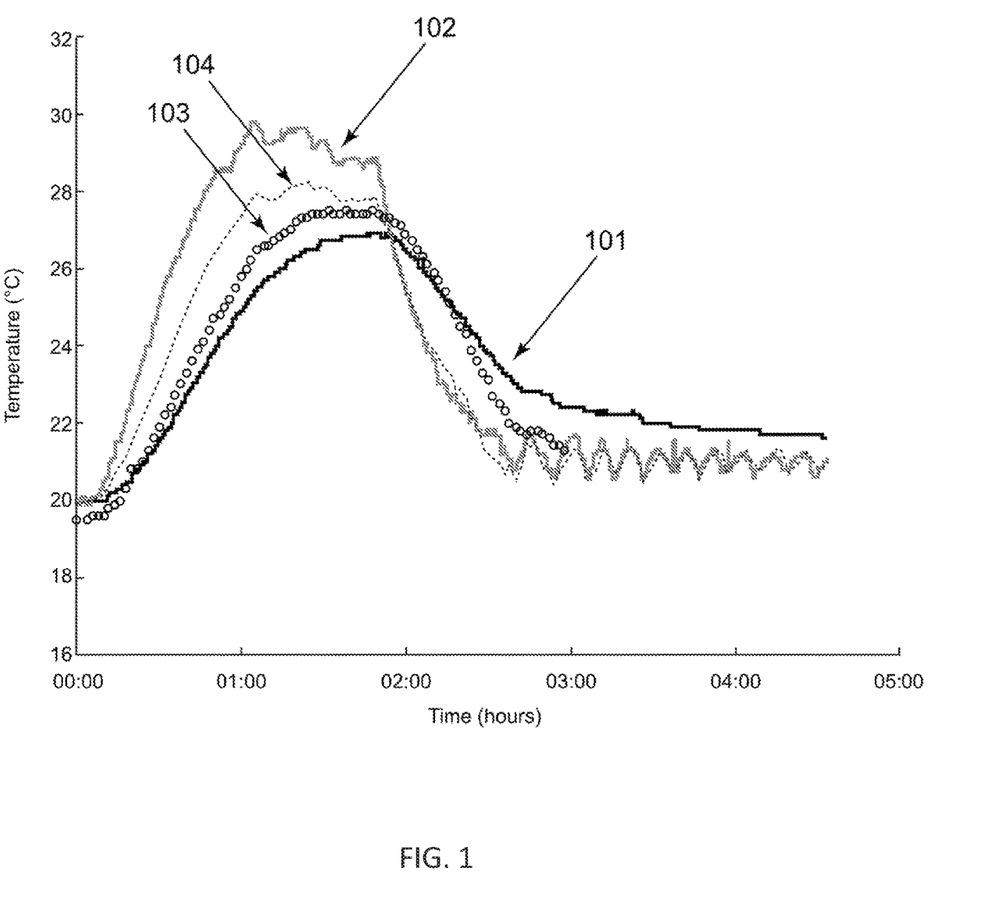
FIG. 1 illustrates the recorded temperature over time of two versions of the TearLab Osmolarity System compared to other thermometers.

The TearLab Osmolarity System labeling requirement for storing test cards at controlled room temperature can become impractical in the real world when air conditioning and heating systems, sunny windows, room lights, nearby equipment or other heating and cooling sources create a dynamically changing temperature environment. If the TearLab Osmolarity System is 1° C. hotter than the test cards, it will report results approximately 6 mOsm/L lower than the target osmolarity. In a problematic scenario, there will be a lasting hysteresis in the system that requires a lengthy wait period to reestablish equilibrium once exposed to rapid environmental changes. As shown in FIG. 1, data from two versions of the TearLab Osmolarity System (101 for the TearLab 1.0 device, and 102 for the TearLab 1.0e device) both show unmatched temperature dynamics against the reference measurements of card temperature as measured by a Fluke 80PK-1 bead probe thermocouple attached to a test card 103, or ambient temperature measured by a Pico Instruments PT-104 platinum resistance thermometer 104. The TearLab 1.0 device had a 0.5° C. resolution thermometer, averaged over 5 samples to gain a system resolution of 0.2° C., mounted on the main board of the base unit device and was susceptible to internal heating variations and tended to lag temperature increases and decreases, while exhibiting hysteresis on the falling edge. The TearLab 1.0e device moved a 0.1° C. resolution thermometer to an enclosed compartment atop the base unit, largely insulated from the internal electronic heating and more sensitive to environmental changes, but tended to lead, and thereby overestimate, rising temperatures. In an attempt to optimize performance for the TearLab 1.0e, an accessory tray was added to the system where test cards were stored and allowed to equilibrate prior to testing. Initial attempts to include thermometers directly inside the Pen were frustrated by the fact that the Pen temperature would increase significantly while a user was holding the Pen, invalidating data generated from internally placed thermocouples. Additionally, given the very high precision required from the system, contact thermometers mounted on the top board adjacent to the card would jeopardize the carefully balanced mechanical system of the test card, as any impact to the pressure sensitive adhesive that sealed the microfluidic channel could compromise the impedance measurement, which held approximately ±3 micron tolerances to achieve said precision. Accordingly, there is a clear need for a temperature sensing solution that improves the estimated temperature response of tear fluid to improve overall accuracy and precision.

SUMMARY

The present disclosure relates generally to improving the measurement of the osmotic pressure of fluids and, more particularly, to improving the measurement accuracy and precision of the osmolarity of the tear film. The approaches described herein improves upon the existing art of tear film osmometry to provide better performance in the presence of environmental instability.

Existing tear film osmolarity systems such as the commercialized TearLab Osmolarity System, use the ambient temperature of the room measured atop a base unit to compensate for the impact of temperature fluctuations on the impedance of the tear fluid. When at equilibrium, the system can perform according to its labeling with high precision. However, under challenging environments where the temperature is changing rapidly, on the order of 5-10 degrees per hour or more, lags in temperature measurement between the system and test cards can affect performance.

The present disclosure provides systems and methods for improving the estimate of the relevant spatiotemporal test card temperature with a noncontact thermometer to minimize variability within an impedance-based tear osmometer.

Provided herein are devices for analyzing a fluidic sample, the device comprising: (a) a handheld osmolarity system comprised of a fluid collection device that accepts a disposable test card interface housing a microfluidic chip for tear collection and analysis; and (b) a microfluidic chip, wherein the volume of the sample fluid operatively covers a sufficient portion of the sample region such that energy imparted to the sample fluid is detected from the sample region to produce an output signal that indicates osmolarity of the sample fluid; and (c) a fluid collection device-mounted infrared non-contact temperature sensor for minimizing the inaccuracy and imprecision of a linear temperature compensation algorithm implemented therewith. In some embodiments, the fluid collection device-mounted infrared non-contact temperature sensor is mounted between 10-20 mm from a distal tip of the microfluidic chip, such that a field of view of the non-contact sensor overlaps with a mixed organic-gold portion of the microfluidic chip, with an inclusive wavelength range of 2-14 μm, an emissivity parameter of 0.7-0.95, and a refresh rate of 0.25-1.5 seconds. In some embodiments, the fluid collection device-mounted infrared non-contact thermopile sensor is mounted between 12-16 mm from the distal tip of the microfluidic chip, such that the field of view of the non-contact sensor overlaps with a mixed organic-gold portion of the microfluidic chip, with an inclusive wavelength range of 2-14 μm, an emissivity parameter of 0.85-0.93, and a refresh rate of 0.5-1.0 seconds. In some embodiments, the fluid collection device-mounted infrared non-contact thermopile sensor emits light at a 20-70° angle, with approximately 50% sensitivity at the 50° angle. In some embodiments, the microfluidic chip has a temperature measurement area that presents gold, polycarbonate, and polyethylene terephthalate to the sensor. In some embodiments, the microfluidic chip has a temperature measurement area that presents gold and polycarbonate to the sensor. In some embodiments, the microfluidic chip has a temperature measurement area that presents gold and polyethylene terephthalate to the sensor. In some embodiments, the microfluidic chip has a temperature measurement area that presents polycarbonate and polyethylene terephthalate to the sensor.

Described herein are microfluidic chips for analyzing a fluidic sample, the chip comprising: (a) a substrate that receives an aliquot volume of a sample fluid; (b) a sample region of the substrate, sized such that the volume of the sample fluid is sufficient to operatively cover a portion of the sample region, whereupon energy properties of the sample fluid are detectable from the sample region to produce a sample fluid reading, wherein the sample fluid reading indicates osmolarity of the sample fluid; (c) wherein the sample region includes a plurality of electrodes disposed to contact the sample; and (d) a temperature measurement area within a microchip. In some embodiments, the temperature measurement area is within a width of microchip from 5.9 mm to 9.5 mm. In some embodiments, the temperature measurement area is within a width of microchip from 7.2 mm to 9.2 mm.

Provided herein are systems for analyzing a fluidic sample, the device comprising: a fluid collection device; a microfluidic chip configured to be mounted on the fluid collection device, the microfluidic chip being configured to collect tear fluid and permit energy to be imparted to collected tear fluid such that an output signal indicating osmolarity of the collected tear fluid is generated; a temperature sensor coupled to the fluid collection device to generate a temperature measurement of the collected tear fluid; and a processor coupled to the temperature sensor and configured to run a temperature compensation algorithm based on the generated temperature measurement, wherein the temperature sensor is configured to be positioned relative to the microfluidic chip to reduce one or more of inaccuracy or imprecision of the temperature compensation algorithm. In some embodiments, the fluid collection device is configured to be handheld. In some embodiments, the microfluidic chip configured to be removably mounted on the fluid collection device. In some embodiments, the temperature sensor comprises a non-contact temperature sensor. In some embodiments, the temperature sensor comprises an infrared temperature sensor. In some embodiments, the temperature sensor is configured to be mounted between 10-20 mm from a distal tip of the microfluidic chip such that a field of view of the temperature sensor overlaps with an electrode portion of the microfluidic chip. In some embodiments, the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.7-0.95, or a refresh rate of 0.25-1.5 seconds. In some embodiments, the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.85-0.93, or a refresh rate of 0.5-1.0 seconds. In some embodiments, the temperature sensor is configured to be mounted between 12-16 mm from the distal tip of the microfluidic chip.

Other objects and features of the present disclosure will become apparent by a review of the specification, claims, and appended figures.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The present disclosure relates generally to improving the measurement of the osmotic pressure of fluids and, more particularly, to improving the measurement accuracy and precision of the osmolarity of the tear film. In particular, this disclosure describes preferred embodiments for creating thermal measurement systems that more closely match the dynamics of collected tear fluid temperatures over time in non-equilibrium temperature environments.

A currently preferred embodiment of the present disclosure may include a pen-mounted infrared non-contact temperature (i.e., thermopile) sensor mounted between 10-20 mm from the distal tip of the microfluidic chip, such that the field of view of the IR sensor overlaps with a mixed organic-gold portion of the microfluidic chip, with an inclusive wavelength range of 2-14 μm, an emissivity parameter of 0.7-0.95 and a refresh rate of 0.25-1.5 seconds, such that the interrogated area of mass of the test card is optimally aligned to follow the thermal dynamics of the fluid within the interior voltage electrodes, while reducing or minimizing the inaccuracy and imprecision of a linear temperature compensation therein. In such preferred embodiments, the spatial alignment and parameter set of the IR sensor can avoid thermal distortion from the portion of the test card that contacts the body and increases in temperature during tear collection but may be fast enough to follow any high temporal frequency excursions of the substrate. As the test card is roughly triangular at the collection tip, a sensor too far to the back of the microfluidic chip may be susceptible to lagging thermal dynamics and unstable reflections from a mostly-gold covered substrate. Accordingly, the present disclosure centers around the innovation that a sensor mounted in exactly within the window of space with the appropriate timing and emissivity parameters could overcome the dynamic challenges posed by real world environmental instabilities.

Figure 2A:
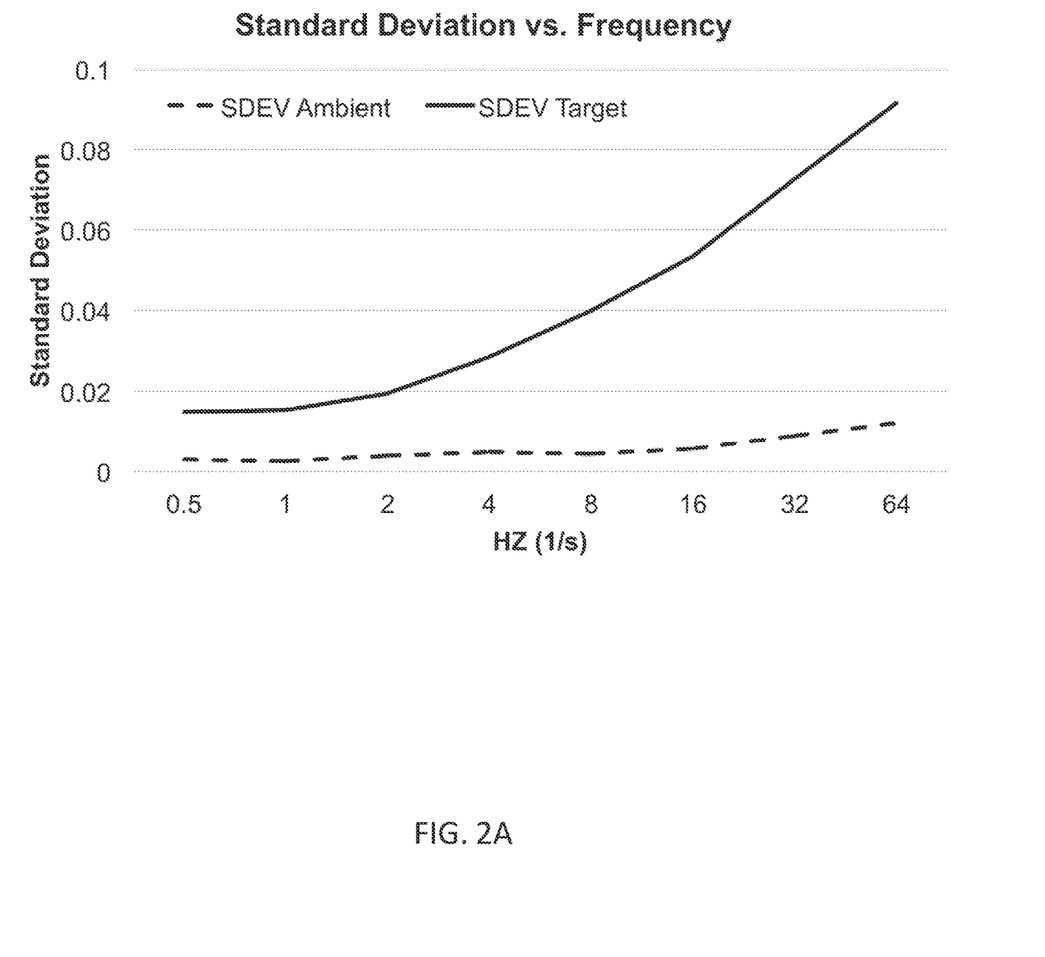
FIG. 2A shows a graph of standard deviation versus frequency of collection and FIG. 2B shows an example of impedance over time within a microfluidic channel sampled at 10 Hz.
Figure 2B:
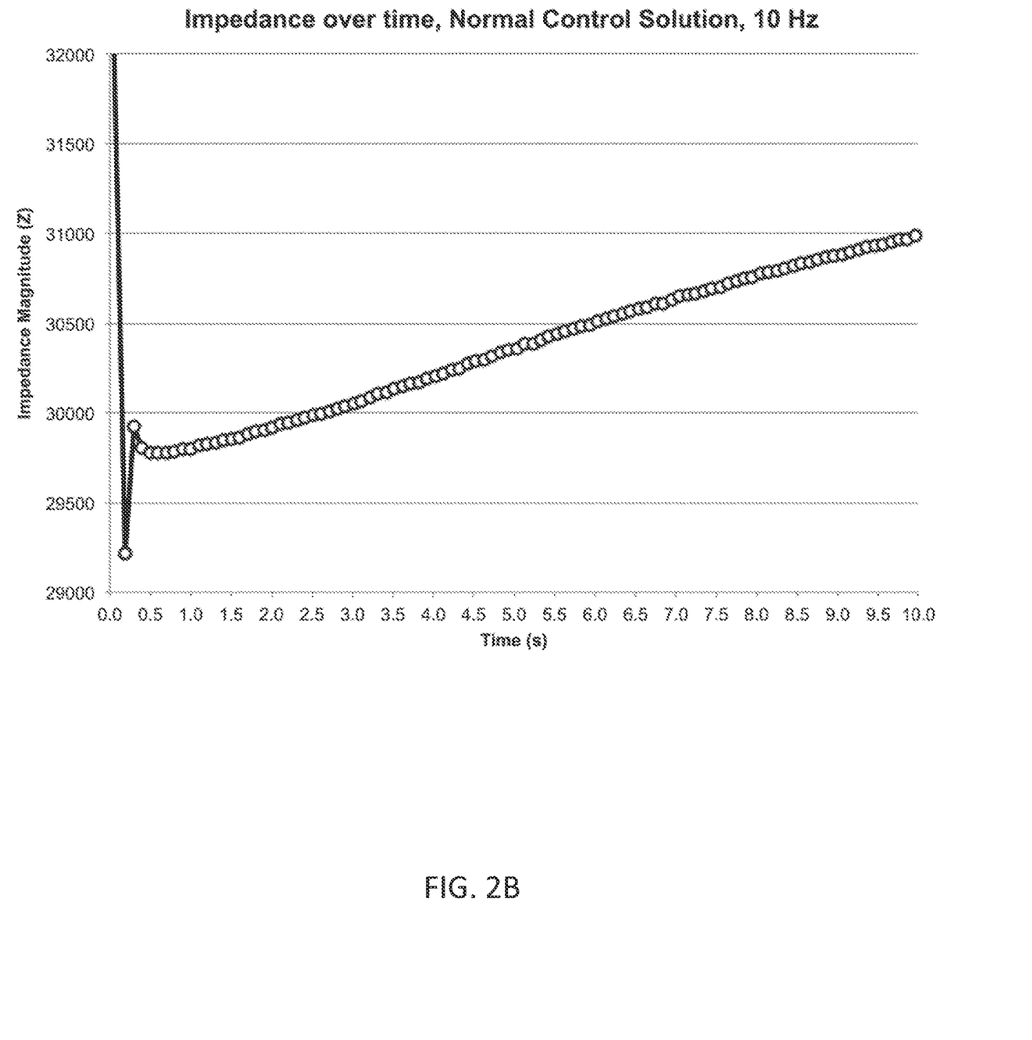

For example, a preferred embodiment shown in FIG. 2A, unlike an ambient temperature measurement which is relatively invariant to temporal frequency, the standard deviation of temperature measurement of the microfluidic chip performs better toward the lower frequencies of interrogation. From a system perspective, as shown in FIG. 2B, the impedance of a typical collected tear fluid demonstrates a rapid initial transient following the bridging of the interior measurement voltage electrodes from an open circuit, followed by a second order mechanical relaxation oscillation atop a rising step response as thermal and fluidic gradients dissipate in the fluid. Accordingly, a preferred embodiment may use an approximately 0.9 second integration time to that allows for the system to both minimize the inherent temperature measurement variability and follow the relevant temporal movements of the fluid within the channel.

Figure 3:
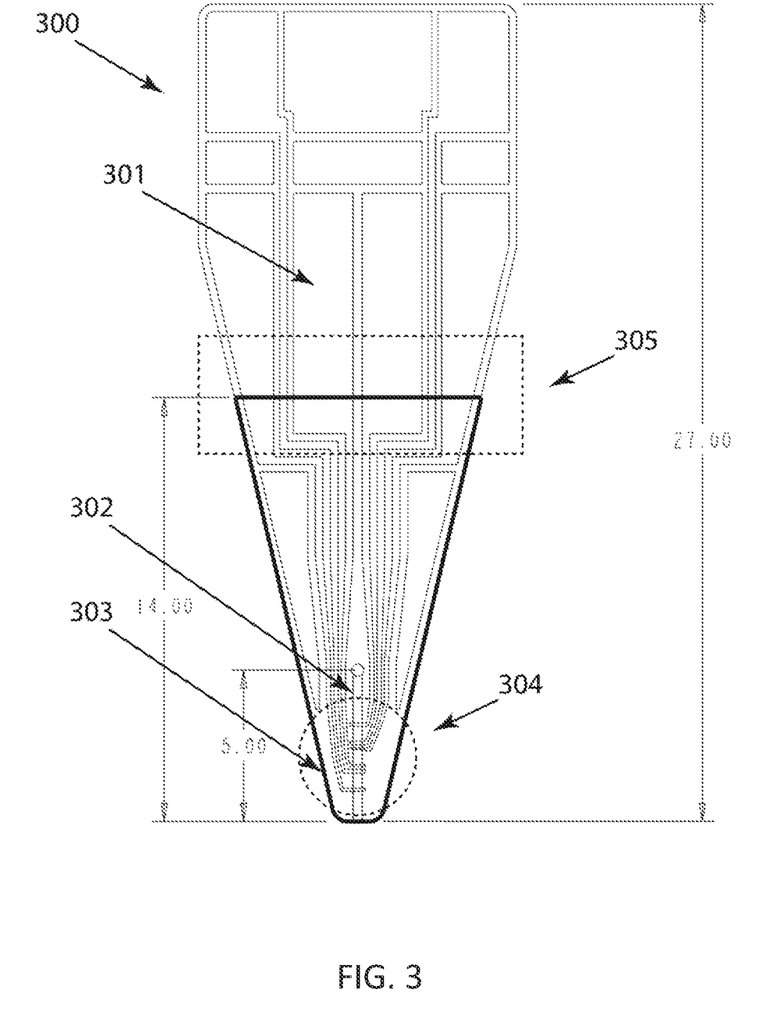
FIG. 3 illustrates a preferred embodiment of the mixed organic gold temperature measurement area of the microfluidic chip.

An embodiment shown in FIG. 3 shows an illustration of a polycarbonate tear collection microchip 300 approximately 27 mm in length, substantially covered in gold electrodes e.g., 301, that descend down along the contour of a microfluidic channel 302 that is sealed by a hydrophilic pressure sensitive adhesive 303 (thick line). While the impedance is measured within the dotted circle region of the microfluidic channel 304, a preferred embodiment may focus the infrared sensor on the mixed organic/gold temperature measurement area highlighted by the dotted line 305, from about 10-20 mm from the tip of the microfluidic chip, or 8-16 mm in some preferred embodiments. Note that in tables discussing infrared sensing of materials, metals such as gold tend to have very low emissivity parameters, e.g., Fluke, a well-known manufacturer of infrared sensors states that at 1.6 μm wavelengths, gold has an emissivity of approximately 0.01-0.1 while most organic surfaces are closer to 0.95 [https://www.flukeprocessinstruments.com/en-us/print/node/35230], and at larger wavelengths in the 8-14 μm range, gold is listed as "n.r." or not recommended to measure. Tests showed that the mixed gold/organic emissivity of the rectangular dotted area was optimized closer to 0.7-0.95, or in some embodiments, 0.85-0.93, resulting from the nonlinear relationship between the gold, polycarbonate and polyethylene terephthalate pressure sensitive adhesive in area 305. Thus in the preferred embodiments, the chip may present an area of gold, polycarbonate and polyethylene terephthalate to the sensor. In other embodiments, the chip presents an area of gold and polycarbonate to the sensor. In other embodiments, the chip presents an area of gold and polyethylene terephthalate to the sensor. In other embodiments, the chip presents an area of polycarbonate and polyethylene terephthalate to the sensor. In certain embodiments, the width of the measurement area of the microfluidic chip (microchip) is optimized to align the dynamics of the measurement and protect it from thermal ingress from patient testing. In certain embodiments, the microchip has a temperature measurement area within a width of microchip from of 5.9 mm to 9.5 mm. In certain embodiments, the microchip has a temperature measurement area within a width of microchip from of 7.2 mm to 9.2 mm.

In certain embodiments, the infrared non-contact thermopile sensor emits light at a 10-80° angle, or more specifically a 20-70° angle, with approximately 50% sensitivity at the 50° angle.

By interrogating this particular cross-section of the microchip, with an inclusive wavelength range of 2-14 μm, an emissivity parameter of 0.7-0.95 (or in other embodiments, 0.85-0.93) and a refresh rate of 0.25-1.5 seconds (or in other embodiments 0.5-1.0 seconds), the interrogated area of mass of the test card may be capable of more accurately estimating the thermal dynamics of the fluid within the interior voltage electrodes without undue influence from heat emitted from the patient during tear collection, yet fast enough to not appreciably lag transients during unstable environments, and not so fast to lead the fluid within the microchannel.

Figure 4:
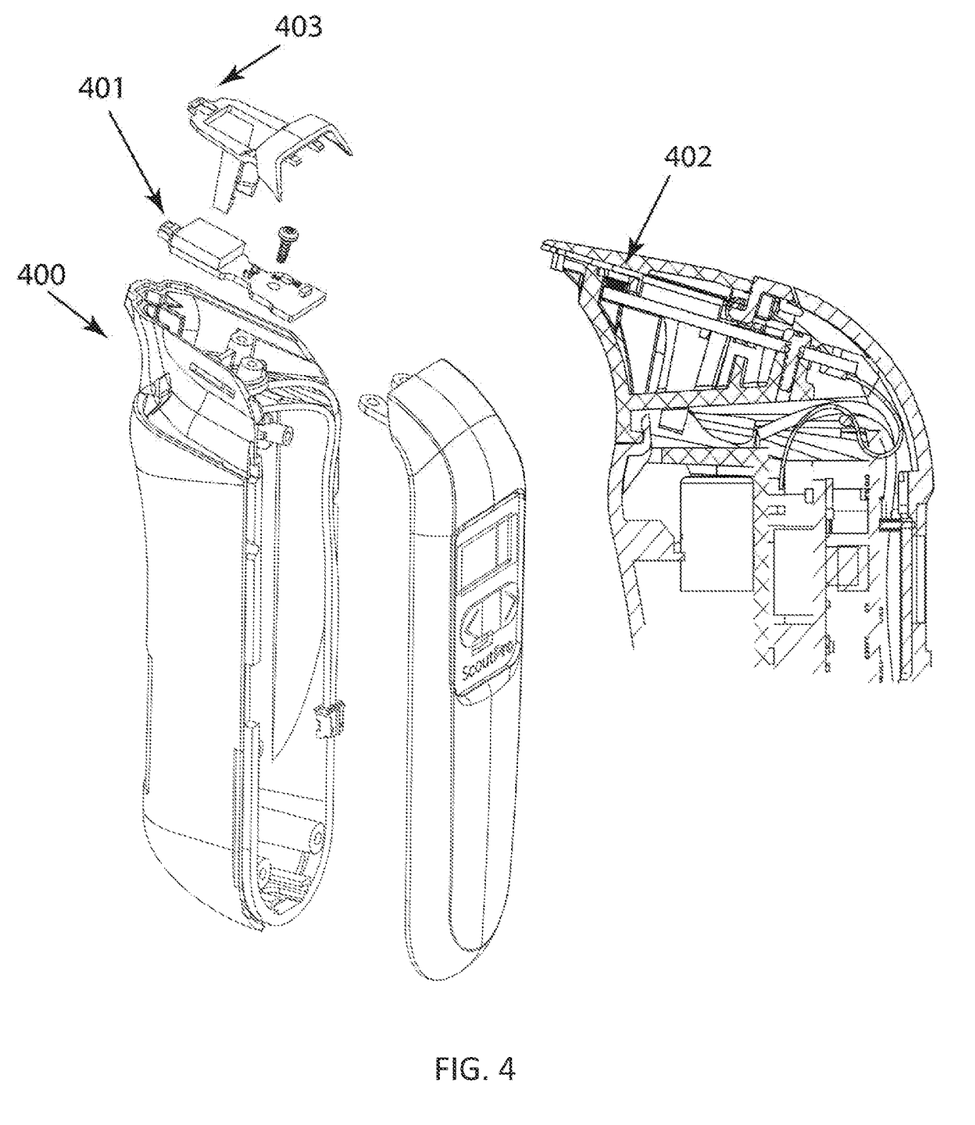
FIG. 4 gives an example of a preferred embodiment of the non-contact sensor placement in relationship to the Pen body.

FIG. 4 shows an exploded view of some of the mechanical aspects of a preferred embodiment of Pen 400 with an integrated temperature sensor chip 401 in the 10-16 mm from the top of the microfluidic chip. The sensor is also shown also in cross section of the assembled unit as a black square 402, approximately 1-4 mm away from the microfluidic chip surface, physically protected by a cap 403.

While preferred embodiments of the present disclosure have been shown and described herein, it is to be understood that the disclosure is not limited to the particular embodiments of the disclosure described below, as variations of the particular embodiments can be made and still fall within the scope of the appended claims. It is also to be understood that the terminology employed is for the purpose of describing particular embodiments of the disclosure and is not intended to be limiting. Instead, the scope of the present disclosure is established by the appended claims. In this specification and the appended claims, the singular forms "a," "an" and "the" include plural reference unless the context clearly dictates otherwise.

As used herein A and/or B encompasses one or more of A or B, and combinations thereof such as A and B.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure provided herein. The upper and lower limits of these smaller ranges can independently be included in the smaller ranges, and are also encompassed within the disclosure, subject to any specifically excluded limit in the stated range. Where the stated range includes one or both of the limits, ranges excluding either or both of those included limits are also included in the disclosure provided herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. The term "about" as used herein refers to a range that is 10% plus or minus from a stated numerical value within the context of the particular usage.

Unless otherwise specified, the presently described methods and processes can be performed in any order. For example, a method describing steps (a), (b), and (c) can be performed with step (a) first, followed by step (b), and then step (c). Or, the method can be performed in a different order such as, for example, with step (b) first followed by step (c) and then step (a). Furthermore, those steps can be performed simultaneously or separately unless otherwise specified with particularity.

The specific dimensions of any of the apparatuses, devices, systems, and components thereof, of the present disclosure can be readily varied depending upon the intended application, as will be apparent to those of skill in the art in view of the disclosure herein. Moreover, it is understood that the examples and embodiments described herein are for illustrative purposes only and that various modifications or changes in light thereof can be suggested to persons skilled in the art and are included within the spirit and purview of this application and scope of the appended claims. Numerous different combinations of embodiments described herein are possible, and such combinations are considered part of the present disclosure. In addition, all features discussed in connection with any one embodiment herein can be readily adapted for use in other embodiments herein. The use of different terms or reference numerals for similar features in different embodiments does not necessarily imply differences other than those expressly set forth.

EXAMPLES

Example 1: Equilibrated Performance

By way of example, a handheld osmometer with an integrated temperature sensor aligned 12-16 mm from the tip of the microfluidic chip, emitting an inclusive wavelength range of 2-14 μm, an emissivity parameter of 0.9 and a refresh rate of 0.5 seconds was tested at a thermal equilibrium at room temperature, 15, 20, 25 and 30° C. with 20 test cards at each temperature with a NIST-traceable sodium chloride solution with an expected mean of 338 mOsm/L. The coefficient of variation (standard deviation divided by the mean) at each temperature was 0.89%, 0.79%, 0.81%, 0.79% & 0.94% respectively, which is measurably improved from the labeled performance of the commercialized TearLab Osmolarity System of 1.87-2.47% or the literature reported CVs of 1.0-1.6% in Rocha G et al.

Example 1 Results

|  | Room | 15° C. | 20° C. | 25° C. | 30° C. |
|---|---|---|---|---|---|
| Test 1 | 340 | 342 | 346 | 333 | 332 |
| Test 2 | 344 | 343 | 348 | 342 | 336 |
| Test 3 | 347 | 347 | 345 | 336 | 337 |
| Test 4 | 340 | 339 | 342 | 337 | 338 |
| Test 5 | 342 | 336 | 344 | 341 | 332 |
| Test 6 | 342 | 342 | 342 | 338 | 332 |
| Test 7 | 340 | 343 | 342 | 339 | 336 |
| Test 8 | 338 | 341 | 344 | 341 | 328 |
| Test 9 | 341 | 341 | 337 | 335 | 335 |
| Test 10 | 342 | 344 | 342 | 338 | 337 |
| Test 11 | 344 | 343 | 342 | 335 | 341 |
| Test 12 | 343 | 340 | 342 | 334 | 339 |
| Test 13 | 339 | 338 | 340 | 339 | 332 |
| Test 14 | 333 | 337 | 338 | 338 | 339 |
| Test 15 | 342 | 339 | 340 | 339 | 338 |
| Test 16 | 341 | 340 | 341 | 338 | 337 |
| Test 17 | 346 | 340 | 343 | 343 | 336 |
| Test 18 | 344 | 337 | 339 | 339 | 337 |
| Test 19 | 341 | 339 | 341 | 341 | 333 |
| Test 20 | 339 | 340 | 346 | 337 | 336 |
| Average | 341.4 | 340.55 | 342.2 | 338.15 | 335.55 |
| Stdev | 3.1 | 2.7 | 2.8 | 2.7 | 3.2 |
| CV | 0.89% | 0.79% | 0.81% | 0.79% | 0.94% |

Example 2: Non-Equilibrium Performance

By way of example, a handheld osmometer with an integrated temperature sensor aligned 12-16 mm from the tip of the microfluidic chip, emitting an inclusive wavelength range of 2-14 μm, an emissivity parameter of 0.9 and a refresh rate of 0.5 seconds was tested by moving warm test cards from either a 28° C. environmental chamber to a room with an ambient temperature of 23.8-24.1° C., or a 12° C. environmental chamber to a room with an ambient temperature of 24.1-24.2° C., or at room temperature after equilibrating for one hour. Cards were tested within three minutes of being moved from one temperature environment to the other to encourage environmental transients. Note that the handheld osmolarity system (HOS) with the aforementioned integrated sensor maintained and even improved upon labeled precision (0.3-1.4% CV) despite very challenging thermal transients, whereas the performance of the commercialized TearLab Osmolarity System (OS) moved closer and in some cases outside the limits labeled performance (2.2-3.1% CV).

|  | HOS | OS |  | HOS | OS |
|---|---|---|---|---|---|
| Warm to Ambient | 339 | 362 | Average | 341.3 | 352 |
|  | 342 | 345 | Stdev | 2.9 | 8 |
|  | 339 | 355 | CV | 0.8% | 2.3% |
|  | 345 | 346 |  |  |  |
| Cold to Ambient | 348 | 308 | Average | 350.8 | 323 |
|  | 357 | 327 | Stdev | 4.9 | 10 |
|  | 352 | 328 | CV | 1.4% | 3.1% |
|  | 346 | 329 |  |  |  |
| Room Equilibrated | 343 | 331 | Average | 342.3 | 335.3 |
|  | 341 | 344 | Stdev | 1.2 | 7.5 |
|  | 343 | 331 | CV | 0.3% | 2.2% |
|  | 341 | 334 |  |  |  |

Example 3: Non-Equilibrium Performance Over Time

Figure 5:
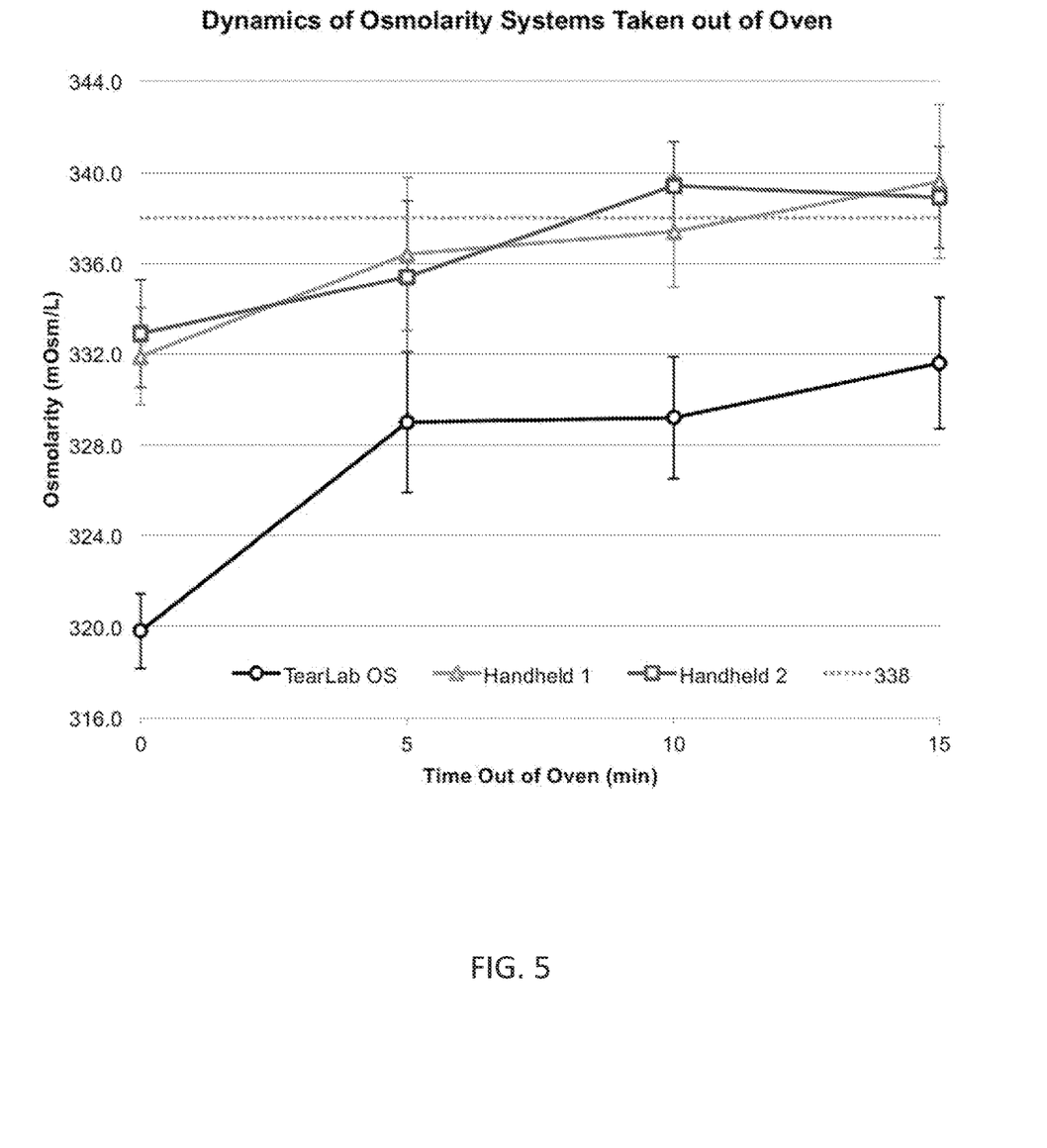
FIG. 5 gives an example of non-equilibrium performance of a preferred embodiment compared to a legacy TearLab Osmolarity System.

By way of example, both a legacy TearLab Osmolarity system and two handheld osmometers assembled as a preferred embodiment, with integrated temperature sensors aligned 12-16 mm from the tip of the microfluidic chip, emitting an inclusive wavelength range of 2-14 µm, an emissivity parameter of 0.9 and a refresh rate of 0.5 seconds were tested by storing the units in a 27° C. environmental chamber for ten minutes, followed by moving all three units to a room with an ambient temperature of 22.6° C. Units were tested with five microfluidic test cards and a NIST-traceable sodium chloride solution with an expected mean of 338 mOsm/L at each timepoint: immediately after removal from the environmental chamber, 5, 10 & 15 minutes following removal. FIG. 5 shows the results of the three systems. After five minutes, the handheld osmometers configured in a preferred embodiment showed means (336.4±3.4 & 335.4±3.3 mOsm/L, respectively) within a standard deviation of the expected value, whereas after 15 minutes of equilibration the legacy TearLab Osmolarity System measured beyond 2 standard deviations away (331.6±2.9 mOsm/L). The handheld osmometers remained within a standard deviation of the expected value for the remainder of the test at both 10 minutes (337.4±2.5 & 339.4±2.0 mOsm/L) and 15 minutes (339.6±3.4 & 338.9±2.2 mOsm/L).

EXEMPLARY EMBODIMENTS

Among the exemplary embodiments are:

Embodiment 1. A device for analyzing a fluidic sample, the device comprising:
(a) a handheld osmolarity system comprised of a fluid collection device that accepts a disposable test card interface housing a microfluidic chip for tear collection and analysis; and
(b) a microfluidic chip, wherein the volume of the sample fluid operatively covers a sufficient portion of the sample region such that energy imparted to the sample fluid is detected from the sample region to produce an output signal that indicates osmolarity of the sample fluid; and
(c) a fluid collection device-mounted infrared non-contact temperature sensor for minimizing the inaccuracy and imprecision of a linear temperature compensation algorithm implemented therewith.

Embodiment 2. The device of embodiment 1, wherein the fluid collection device-mounted infrared non-contact temperature sensor is mounted between 10-20 mm from a distal tip of the microfluidic chip, such that a field of view of the non-contact sensor overlaps with a mixed organic-gold portion of the microfluidic chip, with an inclusive wavelength range of 2-14 µm, an emissivity parameter of 0.7-0.95, and a refresh rate of 0.25-1.5 seconds.

Embodiment 3. The device of embodiment 1 or 2, wherein the fluid collection device-mounted infrared non-contact thermopile sensor is mounted between 12-16 mm from the distal tip of the microfluidic chip, such that the field of view of the non-contact sensor overlaps with a mixed organic-gold portion of the microfluidic chip, with an inclusive wavelength range of 2-14 µm, an emissivity parameter of 0.85-0.93, and a refresh rate of 0.5-1.0 seconds.

Embodiment 4. The device of any one of embodiments 1-3, wherein the fluid collection device-mounted infrared non-contact thermopile sensor emits light at a 20-70° angle, with approximately 50% sensitivity at the 50° angle.

Embodiment 5. The device of any one of embodiments 1-4, wherein the microfluidic chip has a temperature measurement area that presents gold, polycarbonate, and polyethylene terephthalate to the sensor.

Embodiment 6. The device of any one of embodiments 1-5, wherein the microfluidic chip has a temperature measurement area that presents gold and polycarbonate to the sensor.

Embodiment 7. The device of any one of embodiments 1-6, wherein the microfluidic chip has a temperature measurement area that presents gold and polyethylene terephthalate to the sensor.

Embodiment 8. The device of any one of embodiments 1-7, wherein the microfluidic chip has a temperature measurement area that presents polycarbonate and polyethylene terephthalate to the sensor.

Embodiment 9. A microfluidic chip for analyzing a fluidic sample, the chip comprising:
(a) a substrate that receives an aliquot volume of a sample fluid;
(b) a sample region of the substrate, sized such that the volume of the sample fluid is sufficient to operatively cover a portion of the sample region, whereupon energy properties of the sample fluid are detectable from the sample region to produce a sample fluid reading, wherein the sample fluid reading indicates osmolarity of the sample fluid;
(c) wherein the sample region includes a plurality of electrodes disposed to contact the sample; and
(d) a temperature measurement area within a microchip.

Embodiment 10. The device of embodiment 9, wherein the temperature measurement area is within a width of microchip from 5.9 mm to 9.5 mm.

Embodiment 11. The device of embodiment 9 or 10, wherein the temperature measurement area is within a width of microchip from 7.2 mm to 9.2 mm.

Embodiment 12. A system for analyzing a fluidic sample, the device comprising:
   a fluid collection device;
   a microfluidic chip configured to be mounted on the fluid collection device, the microfluidic chip being configured to collect tear fluid and permit energy to be imparted to collected tear fluid such that an output signal indicating osmolarity of the collected tear fluid is generated;
   a temperature sensor coupled to the fluid collection device to generate a temperature measurement of the collected tear fluid; and
   a processor coupled to the temperature sensor and configured to run a temperature compensation algorithm based on the generated temperature measurement,
   wherein the temperature sensor is configured to be positioned relative to the microfluidic chip to reduce one or more of inaccuracy or imprecision of the temperature compensation algorithm.

Embodiment 13. The system of embodiment 12, wherein the fluid collection device is configured to be handheld.

Embodiment 14. The system of embodiment 12 or 13, wherein the microfluidic chip configured to be removably mounted on the fluid collection device.

Embodiment 15. The system of any one of embodiments 12-14, wherein the temperature sensor comprises a non-contact temperature sensor.

Embodiment 16. The system of any one of embodiments 12-15, wherein the temperature sensor comprises an infrared temperature sensor.

Embodiment 17. The system of any one of embodiments 12-16, wherein the temperature sensor is configured to be mounted between 10-20 mm from a distal tip of the microfluidic chip such that a field of view of the temperature sensor overlaps with an electrode portion of the microfluidic chip.

Embodiment 18. The system of any one of embodiments 12-17, wherein the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.7-0.95, or a refresh rate of 0.25-1.5 seconds.

Embodiment 19. The system of embodiment 18, wherein the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.85-0.93, or a refresh rate of 0.5-1.0 seconds.

Embodiment 20. The system of any one of embodiments 17-19, wherein the temperature sensor is configured to be mounted between 12-16 mm from the distal tip of the microfluidic chip.

Embodiment 21. The system of any one of embodiments 12-20, wherein the temperature sensor is configured to emit light at a 20-70° angle, with approximately 50% sensitivity at the 50° angle.

Embodiment 22. The system of any one of embodiments 12-21, wherein the microfluidic chip has a temperature measurement area that presents one or more of gold, polycarbonate, or polyethylene terephthalate to the temperature sensor.

Embodiment 23. The system of any one of embodiments 12-22, wherein the microfluidic chip has a temperature measurement area that presents two or more of gold, polycarbonate, or polyethylene terephthalate to the temperature sensor.

Embodiment 24. The system of any one of embodiments 12-23, wherein the temperature compensation algorithm is a linear temperature compensation algorithm.

Embodiment 25. The system of embodiment 24, wherein the temperature compensation algorithm comprises correcting an impedance measurement based on the measured temperature using a linear correction coefficient.

Embodiment 26. The system of embodiment 25, wherein the linear correction coefficient is about from about 2.00% to about 2.20% per degree.

Embodiment 27. The system of any one of embodiments 12-26, wherein the processor is further configured to generate an osmolarity measurement based on the output signal generated in response to energy imparted to the collected tear fluid and to correct said osmolarity measurement with the temperature compensation algorithm.

Embodiment 28. A method for analyzing a fluidic sample, the method comprising:
   imparting energy to tear fluid collected by a microfluidic chip, thereby generating an output signal;
   measuring a temperature of the collected tear fluid with a temperature sensor; and
   generating a measurement of osmolarity of the collected tear fluid based on the output signal; and
   correcting the measurement of osmolarity based on the measured temperature with a temperature compensation algorithm,
   wherein the temperature sensor is configured to be positioned relative to the microfluidic chip to reduce one or more of inaccuracy or imprecision of the temperature compensation algorithm.

Embodiment 29. The method of embodiment 28, wherein both the microfluidic chip or the temperature sensor are configured to be mounted on a fluid collection device so that the temperature sensor is positioned relative to the microfluidic chip to reduce one or more of inaccuracy or imprecision of the temperature compensation algorithm.

Embodiment 30. The method of embodiment 29, wherein the fluid collection device is configured to be handheld.

Embodiment 31. The method of embodiment 29 or 30, wherein the microfluidic chip configured to be removably mounted on the fluid collection device.

Embodiment 32. The method of any one of embodiments 28-31, wherein the temperature of the collected tear fluid is measured without contact between the temperature sensor and the collected tear fluid.

Embodiment 33. The method of any one of embodiments 28-32, wherein the temperature sensor comprises an infrared temperature sensor.

Embodiment 34. The method of any one of embodiments 28-33, wherein the temperature sensor is mounted between 10-20 mm from a distal tip of the microfluidic chip such that a field of view of the temperature sensor overlaps with an electrode portion of the microfluidic chip.

Embodiment 35. The method of any one of embodiments 28-34, wherein the temperature sensor is mounted from the distal tip of the microfluidic chip such that the field of view of the temperature sensor overlaps with an electrode portion of the microfluidic chip, with one or more of an inclusive wavelength range of 2-14 μm, an emissivity parameter of 0.7-0.95, or a refresh rate of 0.25-1.5 seconds.

Embodiment 36. The method of embodiment 35, wherein the temperature sensor is mounted from the distal tip of the microfluidic chip such that the field of view of the temperature sensor overlaps with an electrode portion of the microfluidic chip, with one or more of an inclusive wavelength range of 2-14 μm, an emissivity parameter of 0.85-0.93, or a refresh rate of 0.5-1.0 seconds.

Embodiment 37. The method of any one of embodiments 34-36, wherein the temperature sensor is configured to be mounted between 12-16 mm from the distal tip of the microfluidic chip.

Embodiment 38. The method of any one of embodiments 28-37, wherein the temperature sensor emits light at a 20-70° angle, with approximately 50% sensitivity at the 50° angle.

Embodiment 39. The method of any one of embodiments 28-38, wherein the microfluidic chip has a temperature measurement area that presents one or more of gold, polycarbonate, or polyethylene terephthalate to the temperature sensor.

Embodiment 40. The method of any one of embodiments 28-39, wherein the microfluidic chip has a temperature measurement area that presents two or more of gold, polycarbonate, or polyethylene terephthalate to the temperature sensor.

Embodiment 41. The method of any one of embodiments 28-40, wherein the temperature compensation algorithm is a linear temperature compensation algorithm.

Embodiment 42. The method of embodiment 41, wherein the temperature compensation algorithm comprises correcting an impedance measurement based on the measured temperature using a linear correction coefficient.

Embodiment 43. The method of embodiment 42, wherein the linear correction coefficient is about 2.00% to about 2.20% per degree.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the present disclosure described herein may be employed in practicing the systems, device, and methods of the present disclosure. It is intended that the following claims define the scope of the systems, device, and methods and that methods and structures within the scope of these claims and their equivalents be covered thereby.

INCORPORATION BY REFERENCE

The entire disclosure of each of the patent documents and scientific articles referred to herein is incorporated by reference for all purposes.

The systems, device, and methods of the present disclosure may be embodied in other specific forms without departing from the spirit or essential characteristics thereof. The foregoing embodiments are therefore to be considered in all respects illustrative rather than limiting the disclosures described herein. Scope of the disclosure is thus indicated by the appended claims rather than by the foregoing description, and all changes that come within the meaning and range of equivalency of the claims are intended to be embraced therein.

What is claimed is:

1. A device for analyzing a fluidic sample, the device comprising:
    (a) a handheld osmolarity system comprised of a fluid collection device that accepts a disposable test card interface housing a microfluidic chip for tear collection and analysis; and
    (b) a microfluidic chip, wherein the volume of the sample fluid operatively covers a sufficient portion of the sample region such that energy imparted to the sample fluid is detected from the sample region to produce an output signal that indicates osmolarity of the sample fluid; and
    (c) a fluid collection device-mounted infrared non-contact temperature sensor for minimizing the inaccuracy and imprecision of a linear temperature compensation algorithm implemented therewith.

2. The device of claim 1, wherein the fluid collection device-mounted infrared non-contact temperature sensor is mounted between 10-20 mm from a distal tip of the microfluidic chip, such that a field of view of the non-contact sensor overlaps with a mixed organic-gold portion of the microfluidic chip, with an inclusive wavelength range of 2-14 μm, an emissivity parameter of 0.7-0.95, and a refresh rate of 0.25-1.5 seconds.

3. The device of claim 1, wherein the fluid collection device-mounted infrared non-contact thermopile sensor is mounted between 12-16 mm from the distal tip of the microfluidic chip, such that the field of view of the non-contact sensor overlaps with a mixed organic-gold portion of the microfluidic chip, with an inclusive wavelength range of 2-14 μm, an emissivity parameter of 0.85-0.93, and a refresh rate of 0.5-1.0 seconds.

4. The device of claim 1, wherein the fluid collection device-mounted infrared non-contact thermopile sensor emits light at a 20-70° angle, with approximately 50% sensitivity at the 50° angle.

5. The device of claim 1, wherein the microfluidic chip has a temperature measurement area that presents gold, polycarbonate, and polyethylene terephthalate to the sensor.

6. The device of claim 1, wherein the microfluidic chip has a temperature measurement area that presents gold and polycarbonate to the sensor.

7. The device of claim 1, wherein the microfluidic chip has a temperature measurement area that presents gold and polyethylene terephthalate to the sensor.

8. The device of claim 1, wherein the microfluidic chip has a temperature measurement area that presents polycarbonate and polyethylene terephthalate to the sensor.

9. A microfluidic chip for analyzing a fluidic sample, the chip comprising:
    (a) a substrate that receives an aliquot volume of a sample fluid;
    (b) a sample region of the substrate, sized such that the volume of the sample fluid is sufficient to operatively cover a portion of the sample region, whereupon energy properties of the sample fluid are detectable from the sample region to produce a sample fluid reading, wherein the sample fluid reading indicates osmolarity of the sample fluid;
    (c) wherein the sample region includes a plurality of electrodes disposed to contact the sample; and
    (d) a temperature measurement area within a microchip.

10. The device of claim 9, wherein the temperature measurement area is within a width of microchip from 5.9 mm to 9.5 mm.

11. The device of claim 9, wherein the temperature measurement area is within a width of microchip from 7.2 mm to 9.2 mm.

12. A system for analyzing a fluidic sample, the device comprising:
- a fluid collection device;
- a microfluidic chip configured to be mounted on the fluid collection device, the microfluidic chip being configured to collect tear fluid and permit energy to be imparted to collected tear fluid such that an output signal indicating osmolarity of the collected tear fluid is generated;
- a temperature sensor coupled to the fluid collection device to generate a temperature measurement of the collected tear fluid; and
- a processor coupled to the temperature sensor and configured to run a temperature compensation algorithm based on the generated temperature measurement,
- wherein the temperature sensor is configured to be positioned relative to the microfluidic chip to reduce one or more of inaccuracy or imprecision of the temperature compensation algorithm.

13. The system of claim 12, wherein the fluid collection device is configured to be handheld.

14. The system of claim 12, wherein the microfluidic chip configured to be removably mounted on the fluid collection device.

15. The system of claim 12, wherein the temperature sensor comprises a non-contact temperature sensor.

16. The system of claim 12, wherein the temperature sensor comprises an infrared temperature sensor.

17. The system of claim 12, wherein the temperature sensor is configured to be mounted between 10-20 mm from a distal tip of the microfluidic chip such that a field of view of the temperature sensor overlaps with an electrode portion of the microfluidic chip.

18. The system of claim 12, wherein the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.7-0.95, or a refresh rate of 0.25-1.5 seconds.

19. The system of claim 18, wherein the temperature sensor is configured to be mounted from the distal tip of the microfluidic chip such that the field of view of the temperature sensor overlaps with an electrode portion of the microfluidic chip, with one or more of an inclusive wavelength range of 2-14 μm, an emissivity parameter of 0.85-0.93, or a refresh rate of 0.5-1.0 seconds.

20. The system of claim 17, wherein the temperature sensor is configured to be mounted between 12-16 mm from the distal tip of the microfluidic chip.

\* \* \* \* \*